(12) United States Patent
Ait El Hadj (10) Patent No.: US 11,554,713 B2
(45) Date of Patent: Jan. 17, 2023

(54) SIGNALING DEVICE WITH BUILT-IN ACCELEROMETER CARRIED ON THE BACK OF A USER OF A LOCOMOTIVE MACHINE

(71) Applicant: Mohamed Ait El Hadj, Nice (FR)

(72) Inventor: Mohamed Ait El Hadj, Nice (FR)

( * ) Notice: Subject to any disclaimer, the term of this patent is extended or adjusted under 35 U.S.C. 154(b) by 154 days.

(21) Appl. No.: 16/771,926

(22) PCT Filed: Nov. 27, 2018

(86) PCT No.: PCT/EP2018/082709
§ 371 (c)(1),
(2) Date: Jun. 11, 2020

(87) PCT Pub. No.: WO2019/115222
PCT Pub. Date: Jun. 20, 2019

(65) Prior Publication Data
US 2020/0307444 A1 Oct. 1, 2020

(30) Foreign Application Priority Data
Dec. 14, 2017 (FR) ...................................... 1771364

(51) Int. Cl.
*B60Q 1/26* (2006.01)
(52) U.S. Cl.
CPC ........ *B60Q 1/2673* (2013.01); *B60Q 2900/30* (2013.01)
(58) Field of Classification Search
CPC .. B60Q 1/2673; B60Q 2900/30; B60Q 11/00; B60Q 2900/10; B60Q 1/2603
See application file for complete search history.

(56) References Cited

U.S. PATENT DOCUMENTS 9,096,174 B1 8/2015 Banks
2007/0063821 A1* 3/2007 Finkle .................... G08B 25/12
340/287

(Continued)

FOREIGN PATENT DOCUMENTS

DE 202006019330 U1 4/2008
FR 2870505 A1 11/2005

(Continued)

OTHER PUBLICATIONS

International Search Report and Written Opinion dated Jun. 9, 2018 in counterpart application No. PCT/EP2018/082709; with English partial translation and partial machine translation (total 21 pages).

*Primary Examiner* — Daryl C Pope
(74) *Attorney, Agent, or Firm* — Seckel IP, PLLC (57) ABSTRACT

The invention relates to a signalling device (1) designed to be removably placed on the back of a user of a locomotive engine, the device (1) including electronic means for signal processing and for controlling the switching-on and/or switching-off of the at least one secondary signal light (3*d*, 3*g*) synchronously with the switching-on and/or switching-off of a primary signal light present in the machine. Electronic means are built into an accelerometer and means for interpreting measurements of the accelerometer allow the detection of a lateral variation, to the right or left, of the direction of movement, the means for controlling the at least one secondary signal light (3*d*, 3*g*) comprising means for verifying that the at least one secondary signal light (3*d*, 3*g*) indicates the lateral right or left direction followed by the user and the machine.

20 Claims, 5 Drawing Sheets

(56) References Cited

U.S. PATENT DOCUMENTS

| | | | |
|---|---|---|---|
| 2014/0265843 A1* | 9/2014 | Troxler | B60Q 1/2673 |
| | | | 315/77 |
| 2015/0158417 A1 | 6/2015 | Levi | |
| 2015/0276202 A1* | 10/2015 | Haslem, Sr. | G08B 5/004 |
| | | | 362/108 |
| 2016/0347391 A1* | 12/2016 | Krispin | A41D 1/002 |
| 2017/0066492 A1 | 3/2017 | Arkhangelskiy et al. | |
| 2017/0158118 A1 | 6/2017 | Lenker | |
| 2017/0257934 A1 | 9/2017 | Garvey | |

FOREIGN PATENT DOCUMENTS

| | | |
|---|---|---|
| FR | 3003214 A1 | 9/2014 |
| WO | 2015067403 A1 | 5/2015 |

\* cited by examiner

SIGNALING DEVICE WITH BUILT-IN ACCELEROMETER CARRIED ON THE BACK OF A USER OF A LOCOMOTIVE MACHINE

The present invention relates to a signaling device with built-in accelerometer carried on the back of a user of a locomotive machine.

The locomotive machine may be a land, air or river transport machine. The signaling device is intended in particular, but without this being limitative, for bicycles or motorcycles and the signaling device enables the user to be better seen by the users of the road, in particular by automobile drivers, for example during changes in direction or braking.

Changes in direction and braking are traditionally signaled by means of two indicators and a stop light positioned at the rear of the motorcycles, at a height of approximately one meter. Such an arrangement of the indicators and stop light may not suffice to effectively alert the other users of the road, and in particular automobile drivers. However, the safety of the user of a locomotive machine depends on the visibility that the other users situated in the vicinity of the locomotive machine have thereof.

Some devices already exist, such as reflective strips or brightly colored patches, but these do not make the motorcyclist substantially more visible for all that. Furthermore, these devices do not indicate braking or changes in direction of the vehicle.

The document FR-A-2 870 505 describes a signaling device comprising firstly a transmitter intended to be connected to a circuit controlling at least one primary signaling light of a cycle and secondly a receiver connected to at least one secondary signaling light, said receiver being able to receive a signal transmitted by said transmitter so as to control the switching on and/or off of the secondary signaling device synchronously with the switching on and/or off of the primary signaling light.

In this document, said secondary signaling light is positioned on a support intended to be placed removably on the back of the user. The device can be carried like a backpack by means of straps around the shoulders of the user.

A problem arises when the signaling device is mounted the opposite way round on the back of the user. Taking the example of two signaling lights in the form of two direction indicators, which is not limitative, the right-hand direction indicator may then be on the left on the signaling device and vice versa for the left-hand direction indicator. This is very dangerous for riding the machine since the user may not perceive that his direction indicators are reversed and that the drivers of vehicles moving in the environment of the locomotive machine the user of which is carrying the signaling device are wrongly informed of the future lateral maneuvers of the locomotive machine.

The problem at the basis of the present invention is, for a signaling device carried by a user of a locomotive machine according to the prior art, to detect when the secondary signaling light or lights for a lateral movement indicate an opposite movement following a faulty positioning of the signaling device on the back of the user.

To this end, the present invention relates to a signaling system comprising a signaling device intended to be placed removably on the back of a user of a locomotive machine, the back remaining visible in an environment of the machine in motion, the system comprising firstly a transmitter intended to be connected to at least one primary signaling device of the machine indicating a right-hand or left-hand lateral direction that the machine is taking in motion, and secondly the signaling device comprising a receiver connected to at least one secondary signaling light integrated in the signaling device, said receiver being able to receive a signal transmitted by said transmitter, the device comprising electronic means for processing the signal and controlling the switching on and/or off of said at least one secondary signaling device synchronously with the switching on and/or off of said at least one primary signaling light, characterized in that the electronic means include an accelerometer and means for interpreting the measurements of the accelerometer making it possible to detect a right or left lateral variation in direction of movement, the means controlling said at least one secondary signaling light comprising means for checking that said at least one secondary signaling light is indeed indicating the right or left lateral direction followed by the user and the machine.

The technical effect is an immediate detection of a reversal of the light signaling a change in lateral direction, advantageously a direction indicator, compared with the primary signaling light on the machine. This may occur when the device is placed upside-down on the back of the user, advantageously the rider of the locomotive machine, which may disturb the vehicle following the locomotive machine and be a source of accidents.

This is because a system for detecting the direction of a signaling device serving advantageously as a direction indicator offers the user the safety of always making correct signaling of his lateral movements. Taking the non-limitative example of direction indicators, if the user is carrying the device upside-down, having reversed for example the top and bottom of the device, when the user uses a primary right-hand direction indicator in his locomotive machine, it is the left-hand direction indicator as the secondary direction indicator on his back that will switch on. By virtue of the presence of the accelerometer, when the device is mounted upside-down on the back of the user and there is a reversal of direction indicators, this will automatically be detected for a correction that is as rapid as possible.

The accelerometer is compact and does not manifestly increase the weight of the device. The detection of a reversal of a secondary signaling light with respect to an associated primary signaling light is immediate and does not require the user to look behind.

Advantageously, the electronic means comprise means for the automatic reversal of said at least one secondary signaling light when the checking means determine that said at least one secondary signaling light is not indicating the right or left lateral direction followed by the machine, so that said at least one secondary signaling light correctly indicates the right or left lateral direction followed by the user and the machine or the electronic means comprise information means intended for the user that the right or left lateral direction indicated by said at least one secondary signaling light is incorrect.

It follows that the correction of a reversal can be immediate and automatic. This enables the locomotive machine and the user thereof to continue their movement without stopping. Another possibility is offered to the user, that of himself correcting this reversal by stopping and correctly repositioning the device on his back. This is perhaps preferable for a long journey but is not automatic.

The first automatic solution is preferred but leaves possible the second solution after warning of the user may prove judicious. It is possible to combine the two solutions by automatically correcting the reversal of the secondary and primary signaling lights while warning the user of this problem, mainly so that he knows that he has probably wrongly placed the device on his back.

Advantageously, the transmitter is connected to a circuit controlling two right and left primary direction indicator lights of the machine and said at least one secondary indicator light comprises two right and left secondary direction indicator lights, the checking means detecting whether a secondary direction indicator light is or is not in operation according to the electrical supply thereof.

This is a preferred embodiment with two direction indicators as primary and secondary indicator lights.

Advantageously, the transmitter is also connected to a circuit controlling at least one auxiliary primary signaling light of the machine and the device also comprises at least one auxiliary secondary signaling light, said at least one auxiliary primary and secondary signaling light being taken singly or in combination from among a stop light indicating braking, a tail light, a fog light or a hazard warning light.

The same transmitter may serve for various signaling lights indicating different functions. The activation of a signaling light on the locomotive machine is transmitted to the signaling device.

Advantageously, the transmitter has a current detector in the or each control circuit associated with the or a primary signaling light or the information on switching on of a primary signaling light is transmitted by wire connection to the transmitter.

Advantageously, the transmitter comprises a dedicated battery, rechargeable by induction, by microcable via a USB socket or by cable connected to a battery of the locomotive machine, a visual and/or audible indicator present on the device informing of a low dedicated-battery charge for the transmitter.

The visual and/or audible indicator assists the user to become aware that transmission is not taking place between primary and secondary signaling lights and that no signaling is visible on his back. The visual indicator must be easily visible to the user by being situated in the field of vision and the audible indicator requires that the locomotive machine should not cover hearing thereof.

Advantageously, said at least one secondary signaling light is in the form of a lamp or light emitting diodes, a light intensity of which is variable according to external brightness.

On a fine day, it is advantageous for the light intensity to be reduced so as not to dazzle the external environment of the locomotive machine, for example the machines or vehicles moving in the vicinity of the locomotive machine associated with the signaling device.

Advantageously, the device comprises means for the radar detection of another locomotive machine in the vicinity of the locomotive machine for which the device is intended with estimation of a distance separating the other machine from the device and, when this distance is less than a predetermined minimum safety distance between the two machines stored in memory means provided in the electronic means, the means controlling said at least one secondary signaling light switch on said at least one signaling light with recognizable specific intensity and/or periodicity in order to indicate that the predetermined minimum safety distance between the two machines is not complied with.

This makes it possible to increase safety and to inform a user other than the rider of the locomotive machine, which is an auxiliary function of the signaling device according to the present invention. The signaling device serves to inform an external user that he is getting dangerously closer to the locomotive machine associated with the signaling device.

Advantageously, a hollow shell in two portions secured together removably delimits a closed internal space sealingly housing said at least one secondary signaling light, the electronic means and at least one electrical supply source for the electronic means and for the receiver, the device comprising at least one adjustable strap passing through the shell and winding around the body of the user, while having quick attachment means by snapping in.

A shell houses and protects all the sensitive elements of the signaling device. This shell is advantageously carried like a backpack. The shell could however be inserted in a jacket by means of a pocket or an enclosure, in particular by a zip fastener. As an alternative, the shell can be fixed by self-adhesive shutter or be fixed by adjustable straps on the jacket. This jacket may be a protective jacket inflating in the case of accident, known by the term air bag vest.

Advantageously the shell comprises a first shell portion forming a cover and a second shell portion forming a receptacle for the electronic means and for said at least one electrical supply source, the second shell portion being intended to be facing the back of the user, the first and second portions of a shell fitting one in the other with the first shell portion having an opposite face furthest away from the second portion in the fitted-together position of the first and second portions of a shell with transparent zones facing said at least one secondary signaling light housed inside the shell, the shell being provided externally with at least two adjustable straps intended to attach the shell to the back of the user.

The signaling lights are protected by being inserted inside the shell. The transparent zones serve as projectors. There may be reflectors internal to the shell for concentrating or redirecting the associated light beam.

Advantageously, either the second shell portion is intended to rest against a portion of the back of the user, the second shell portion or the entire shell with the first and second shell portions thereof having four passage recesses matched in pairs for passage of a strap portion of one of said at least two adjustable straps, or a shell support is interposed between the second portion and the back of the user, the shell support having a bearing face intended to rest against a portion of the back of the user with, on a face of the shell support opposite to the face matching a portion of the back, quick attachment means of the self-adhesive strip type with the second shell portion, the shell support projecting beyond the shell when the shell is superimposed on the shell support by at least four branches, each branch having a passage recess for a strap portion of one of said at least two adjustable straps, the branches and the passage recess thereof being laterally matched in pairs.

The straps serve as backpack straps and make it possible to hold the shell against the back of the user when the straps are adjusted. It is possible to provide appropriate adjustments according to the morphology of the user and the garments that the user is wearing.

Two embodiments are thus possible. In a first embodiment, the shell also serves as a surface bearing against the back of the user. In the second mode, a specific part fills this role with removable connection between the shell and this part that is a shell support.

The shell support has the advantage of offering a larger bearing surface against the back of the user and, if necessary, presenting this bearing surface conformed to the back of the user, but this requires an additional part in the design of the signaling device as well as a novel connection between the shell support and the shell, which increases the price of the signaling device.

Advantageously, each strap is adjusted so as to be intended to pass around a respective shoulder of the user while passing under the arm of the user, each passage recess having a median stud lying at the middle and in the length of the recess and being in the form of a right-angled parallelepiped having a narrower longitudinal rounded face, a portion of each strap passing around the median stud around the rounded face while leaving free the opposite narrower longitudinal face for each of the two recesses that are associated therewith, each strap having two free ends respectively carrying a male or female snapping-in means.

This allows facilitated adjustment of the length of the straps and prevents a strap slipping during the movement of the locomotive machine.

Advantageously, each strap has an intermediate strap portion oriented towards the other strap at the snapping-in means intended to be situated on the chest of the user, the two intermediate strap portions having a free end with complementary snapping-in means for securing thereof.

Advantageously, the electronic means are in the form of a printed circuit card and the device has one or more systems fulfilling one or more of the following functions: a navigation and local geopositioning function, a function of connection with a cellphone that has downloaded a suitable application, an electronic key function locking starting of the locomotive machine when the signaling device is distant by a predetermined distance from the locomotive machine and unlocking it when it is closer to the locomotive machine than the predetermined distance.

Finally, the invention relates to an assembly consisting of a locomotive machine and signaling system comprising a signaling device carried on the back of a user of the locomotive machine, characterized in that the signaling device is as previously described, and a transmitter housed in the locomotive machine or being situated in the vicinity of the locomotive machine.

Other features, aims and advantages of the present invention will emerge from a reading of the following detailed description with regard to the accompanying drawings given by way of non-limitative examples and on which.

Figure 1:
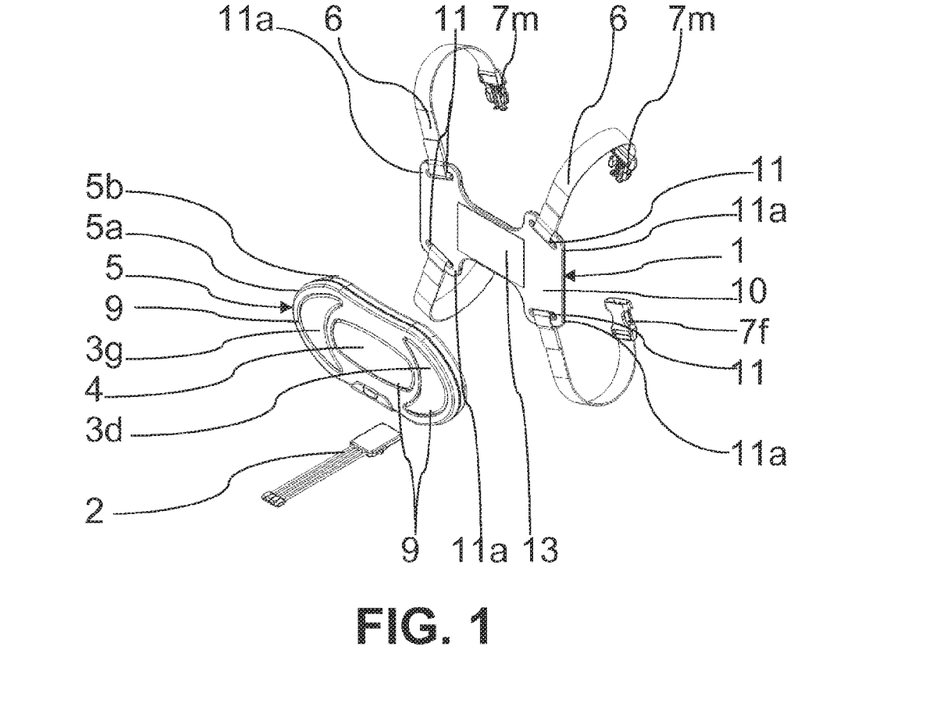
FIG. 1 is a schematic representation of a perspective view of the signaling system according to the present invention, the system comprising a signaling device and a transmitter, the signaling device comprising a shell integrating the electronics and a shell support provided with straps for being attached to the back of a user of a locomotive machine, these elements being shown at a distance from each other.
Figure 2:
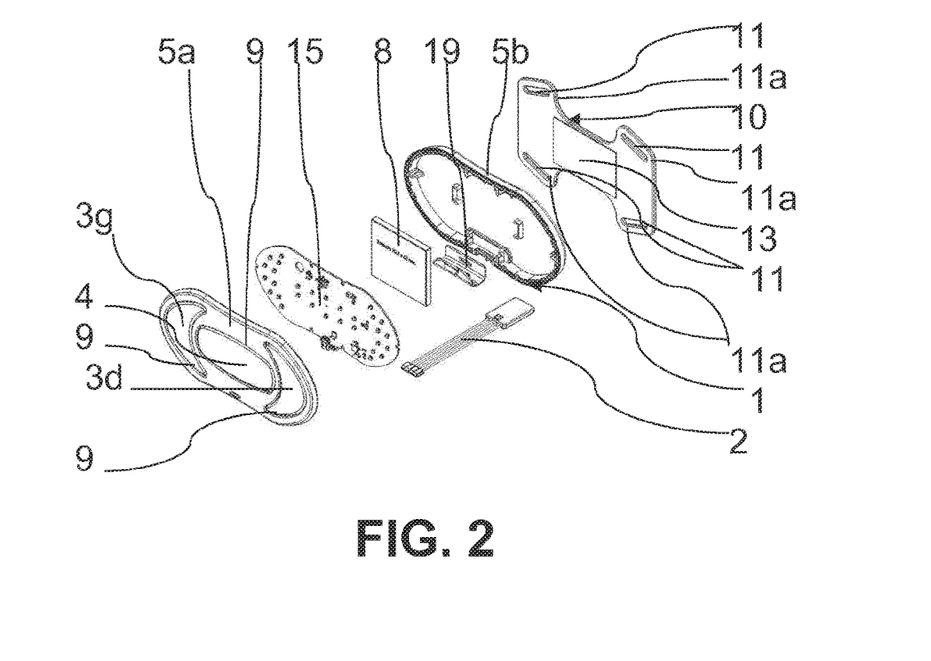
FIG. 2 is a schematic representation of an exploded view of the shell of the signaling device according to the present invention, the transmitter and the shell support also being visible in this figure.

Referring to all the figures and more particularly to FIGS. 1 and 2, the present invention relates to a signaling system S comprising a signaling device 1 intended to be placed removably on the back of a user U of a locomotive machine L, the back remaining visible in an environment of the machine in motion.

The locomotive machine may be a terrestrial, marine or flying machine, the important thing is that the back of the user, mainly the rider. Without this being limitative, the terrestrial machine may be a site machine with tires or tracks, a motor cycle with at least two wheels, a snowmobile, a personnel transporter with platform known by the English term "stepway". For a flying machine, the machine may be a flying autonomous unit with engine known by the English term "Flyboard Air". Finally, the object may be a floating machine such as a jet ski or sea scooter.

The signaling system S comprises the device 1 and a transmitter 2 intended to be connected to the at least one primary signaling light of the machine indicating a right or left lateral direction that the machine is taking in motion, this transmitter 2 being able to be positioned in the locomotive machine.

The device 1 comprises a receiver connected to the at least one secondary signaling light 3*d*, 3*g* integrated in the signaling device 1, said receiver being able to receive a signal transmitted by said transmitter 2.

The device 1 comprises electronic means for processing the signal and controlling the switching on and/or off of said at least one secondary signaling light 3*d*, 3*g* synchronously with the switching on and/or off of said at least one primary signaling light. The primary signaling light or lights are the conventional signaling lights of the locomotive machine. Said at least one primary signaling light may advantageously and in the usual fashion be in the form of two direction indicators 3*d*, 3*g*, but the two direction indicators 3*d*, 3*g* may be grouped together in one and the same signaling light, which is not preferred but falls within the scope of the present invention.

According to the invention, the electronic means integrate an accelerometer and means for interpreting the measurements of the accelerometer make it possible to detect a right or left lateral variation in direction of movement. The means controlling said at least one secondary signaling light 3*d*, 3*g* comprise means for checking that said at least one secondary signaling light 3*d*, 3*g* is indeed indicating the right or left lateral direction followed by the user and the machine.

This may not be the case when the signaling device 1 is mounted in a reversed position against the back of the user, advantageously when the top of the device 1 is positioned towards the bottom of the back and the bottom of the device 1 is positioned towards the top.

The accelerometer makes it possible to know in which direction the locomotive machine is moving. The accelerometer detects not a position but an acceleration on one of three orthogonal axes. The accelerometer measures the accelerations and measures the changes in speed and the changes in position, in particular the translation movements, which is now used to identify a right or left lateral movement of the machine.

The accelerometer indicates that the locomotive machine has diverted towards the right or left. It is then possible to check whether the secondary signaling light, advantageously a right or left direction indicator, has correctly indicated this diversion, in which case the signaling device 1 is functioning correctly. In the contrary case, an adjustment or a repositioning of the signaling device 1 on the back of the user is carried out either automatically or manually.

In the first automatic case, the electronic means may comprise means for automatic reversal of said at least one secondary signaling light 3d, 3g when the checking means determine that said at least one secondary signaling light 3d, 3g is not indicating the right or left lateral direction followed by the machine, so that said at least one secondary signaling light 3d, 3g correctly indicates the right or left lateral direction followed by the user.

For example, if it has found that it is the right direction indicator that is switched on when there is a diversion towards the left, it is possible to correct this state of affairs and to switch on the left direction indicator for a diversion towards the left and conversely for switching on the right direction indicator for a diversion towards the right. The locomotive machine does not need to be stopped and the user has nothing to do.

A system for reversing the direction of the direction indicators 3d, 3g offers the user the safety of always sending the correct indicator signals. If the user wears the signaling device 1 according to the present invention upside down, when he goes to use the right direction indicator, for the person following, this will be the left direction indicator that would be switched on. By virtue of the correction made by the reversal system, whether the signaling device 1 according to the present invention is worn the right way up or upside down, if the user uses the right direction indicator the person following will always see the right direction indicator.

This makes it possible to correct the error in indicating the lateral direction being followed, this error being dangerous vis-á-vis other machines following the locomotive machine equipped with the signaling device 1 according to the invention. This indication error was due most frequently to putting the signaling device 1 upside down on the back of the user.

In the second case of a manual correction, the machine and the electronic means comprise information means intended for the user that the right or left lateral direction indicated by said at least one secondary indicator 3d, 3g is incorrect. This may be done by an indicator light and/or an audible signal. The user stops the machine and repositions the signaling device 1 correctly on his back. This takes more time than an automatic correction but ensures perfect positioning of the signaling device 1 on the back of the user.

The signaling system comprises a signaling device 1 and a transmitter 2, the signaling device 1 comprising a receiver, at least one lateral secondary signaling light 3d, 3g, preferably two right and left direction indicators 3d, 3g or a signaling light combining the right and left direction indicator functions 3d, 3g. It may also comprise a plurality of other secondary signaling lights controlled indirectly by primary signaling lights in the locomotive machine. The signaling device 1 may comprise one or more batteries for supplying its electronic means and the signaling light or lights as well as for the transmitter 2 and the receiver.

In a preferential embodiment of the invention, the transmitter 2 may be connected to a circuit controlling two left and right primary direction indicator lights 3d, 3g of the machine, and said at least one secondary direction indicator light 3d, 3g comprises two right and left secondary direction indicator lights 3d, 3g. The checking means then detect when a secondary direction indicator light is in operation or not according to the electrical supply thereof.

In addition, the transmitter 2 may also be connected to a circuit controlling at least one primary auxiliary signaling light of the machine. The signaling device 1 may also comprise at least one auxiliary secondary signaling light 4, said at least one auxiliary primary and secondary signaling light being taken singly or in combination from among a stop light indicating braking, a rear light, a fog light or a hazard warning light.

In general, all the primary signaling lights equipping the locomotive machine may be included on the signaling device 1 carried on the back of the user. All this may take place using the same transmitter 2 and the same receiver, which group together the pairings of signaling lights respectively primary and secondary.

At the center of the signaling device 1, there may be a pairing button with one or more visual indicators that start to blink in order to signal that the receiver is in "search mode" of the transmitter 2 embedded in the locomotive machine. By pressing on the brake of the machine for a period of two seconds, the secondary stop signaling light of the signaling device 1 according to the present invention switches on. The transmitter 2 and the receiver are paired.

The signaling device 1 according to the present invention, in particular the receiver and the transmitter 2 thereof, are paired in the factory. The user pairs the transmitter and the receiver by pressing on a button situated under the lighting device close to a type C USB connector. If he presses for less than one second the locomotive machine is switched off, a hazard warning mode is activated or deactivated. If he presses for between two and four seconds, it is an association mode that is activated, if braking is carried out or if braking is not carried out, it is a prolonged standby mode that is activated; if pressing is carried out for more than four seconds, it is a demonstration mode that is initiated. The fog light function can be provided by one or more red light-emitting diodes disposed at the center of the signaling device 1.

The secondary braking signaling light, advantageously with light emitting diodes, can be used to serve as a rear light. It suffices to use two different light intensities, that of the secondary braking light being greater than that of the secondary rear light. This function can be activated manually or when the external light intensity is low, for example at nightfall, or when the signaling device 1 according to the present invention is connected to the vehicle battery, via the magnetic-connection cable. This procures better visibility for the secondary signaling lights.

In the case of emergency braking, the two direction indicators 3d, 3g may switch on in order to go into "hazard warning" mode and an audible signal may begin to bleep in order to warn the user of the locomotive machine. As soon as the user once again actuates the direction indicators 3d, 3g, the "hazard warning" mode stops. This procures the advantage of a reduction in the signaling time of the emergency stop in the event of danger.

Figure 3:
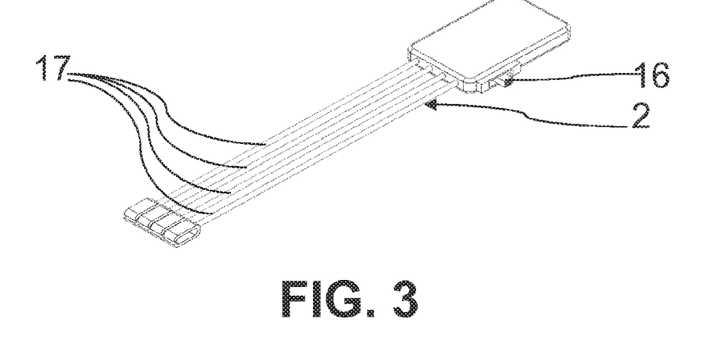
FIG. 3 is a schematic representation of a transmitter forming part of the signaling system according to the present invention.

As can be seen in FIG. 3, a transmitter 2, advantageously in association with a rechargeable miniaturized battery or accumulator independent of the transmitter 2, can be controlled in operating or standby positions by a removable pushbutton 16. The positioning of the pushbutton 16 may be different from the one shown in FIG. 3.

The transmitter 2 may be placed in the locomotive machine or even at a distance from the machine, for example in a pocket of a garment of the user. The function of the transmitter 2 can be activated by a cellphone provided with the appropriate application.

The transmitter 2 may possess its own energy source by means of rechargeable accumulators or batteries. The transmitter 2 may be recharged by induction, by USB microcable or by cable directly connected to the battery.

When the or one of the rechargeable batteries of the transmitter 2, of the receiver or of the device 1 are low, the signaling device 1 according to the present invention is informed thereof by a visual and/or audible signal.

The transmitter 2 is therefore 100% sealed. The signaling device 1 according to the present invention and the transmitter 2 can be recharged by means of an induction system. By placing it on the base of the induction system provided for this purpose, a recharging is carried out without any connection of these two elements.

The transmitter 2 may have a current detector in the or each control circuit associated with the or a primary signaling light or the information on switching on a primary signaling light is transmitted by wire connection to the transmitter 2. The diagnostic socket does not provide the information concerning the switching on of the stop light, of the rear light, of the fog light, of the right direction indicator and of the left direction indicator or of the hazard warning light. The connection between the transmitter 2 and the receiver taking place by radio-frequency waves or Wi-Fi according to a suitable protocol, for example Bluetooth®, which is not limitative.

For example, without this being limitative, the current detectors detect the active signals so as to send the information on switching on of the stop light and/or of the direction indicators 3d, 3g to the signaling device 1. This procures a rapid connection without any specific adaptation that might contravene maintenance of the guarantee of the manufacturer.

As shown in FIG. 3, for the various signaling lights such as the direction indicators 3d, 3g, the braking stop light and the rear lights, the transmitter 2 may be provided with four current detectors, one for each signal. The transmitter 2 is capable of detecting the current flowing in a cable of the signaling system, when the latter is switched on. When the user of the locomotive machine presses on the brake and/or uses the direction indicators 3d, 3g, the signaling lights, advantageously light emitting diodes, primary stop and/or direction indicators 3d, 3g are powered. The transmitter 2 detects this and sends the appropriate signal to the receiver. With regard to the fog light, this is activated from a three-position button. In position 1, the rear light and the fog light are deactivated. In position 2, the rear light is activated alone. In position 3, the rear light and the fog light are activated.

This makes it possible to eliminate the system for connection by quick-engagement lugs or by soldering while avoiding touching the supply cables of the vehicle signaling system. Such a connection is quick and tool-free and does not require any specific adaptation in the locomotive machine that could cancel the guarantee granted by the manufacturer.

Advantageously, said at least one secondary signaling light 3d, 3g is in the form of a lamp or light emitting diodes, a light intensity of which is variable according to external brightness. Light emitting diodes are visible in FIG. 4 on a printed circuit card 15 housing the electronic means and the means for interpreting the measurements from the accelerometer.

It is possible to modify the intensity of the light emitting diodes according to the external brightness. The purpose of this function is to adapt the brightness of the light emitting diodes according to the surrounding light. In daylight, the intensity of the light emitting diodes is more powerful so as to make the signaling device 1 according to the present invention visible, even in sunlight. At night, the intensity of the light emitting diode is reduced, so as not to dazzle the following person. This helps to increase driving safety by not dazzling the machines situated in the vicinity of the locomotive machine associated with the signaling device 1 while providing better energy management.

The signaling device 1 may comprise means for radar detection of another locomotive machine in the vicinity of the locomotive machine for which the device 1 is intended with estimation of a distance separating the other machine from the device 1. When this distance is below a predetermined minimum safety distance between the two machines stored in memory means provided in the electronic means, the means controlling said at least one secondary signaling light 3d, 3g switch on said at least one signaling light with a recognized specific intensity and/or periodicity in order to signal that the predetermined minimum safety distance between the two machines is not complied with.

The predetermined distance is dependent on the speed of the locomotive machine and of the following machine or machines as well as the terrestrial, air or maritime environment in which the machines are moving. This function is activated only if the vehicle is travelling at more than a predetermined speed, also dependent on the environment, rather than stopped. In this case, the main secondary signaling lights of the signaling device 1 according to the present invention, advantageously three in number, with the stop light and the two direction indicators 3d, 3g, can switch on and blink rapidly, for a given period and intensely, in order to signal to the following machine that it is too close, in order for the latter to comply with a sufficient safety distance.

A red signal in the form of an "I" may also switch on and blink in order to signal to the following vehicle that it is too close, so that the latter complies with a sufficient safety distance.

In all cases, the use of such a radar makes it possible to keep a following machine at a safety distance from the locomotive machine equipped with the signaling device 1 according to the present invention.

It is also possible to equip the signaling device 1 with a rear camera and/or a front camera. Thus the signaling device 1 according to the present invention is equipped with two multidirectional cameras. The camera may be positioned on the printed circuit card 15. The user of the travelling machine equipped with the signaling device 1 can see what is happening behind the machine. The images may be retransmitted onto a dedicated screen or onto a cellphone. The camera is activated from the screen or the cellphone. The camera may be activated for reversing or forward running.

With regard to the front camera, this may be positioned in a housing on a strap portion 6 before passing onto the front of the body of the user and serving to hold the signaling device 1 on the back of the user, with or without blinking-light reminder.

In both cases of front or rear camera, the images may be recorded in the memory of the dedicated screen, of the cellphone or in memory means equipping the signaling device 1 while being incorporated advantageously in the printed circuit card 15 inside the device 1. A logo can identify switching to a "signals and statistics recall" application containing the stored images, in the case where such an application is installed in the screen, the cellphone or the device 1. Thus it is possible for the user to reverse his travelling machine equipped with the device 1 without turning his head while having rear visibility in motion, which increases the safety of the locomotive machine.

Referring in particular to FIGS. 1 and 4 to 8, a hollow shell 5 in two portions 5a, 5b secured together removably can delimit a closed internal space sealingly housing said at least one secondary signaling light, the electronic means and at least one electrical supply source 8 for the electronic means and the receiver.

Figure 4:
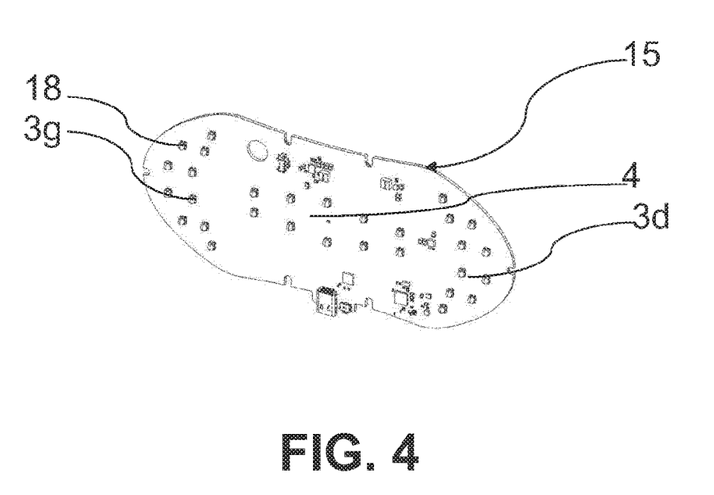
FIG. 4 is a schematic representation of a printed circuit card intended to be housed in the shell of the signaling device according to the present invention.
Figure 5:
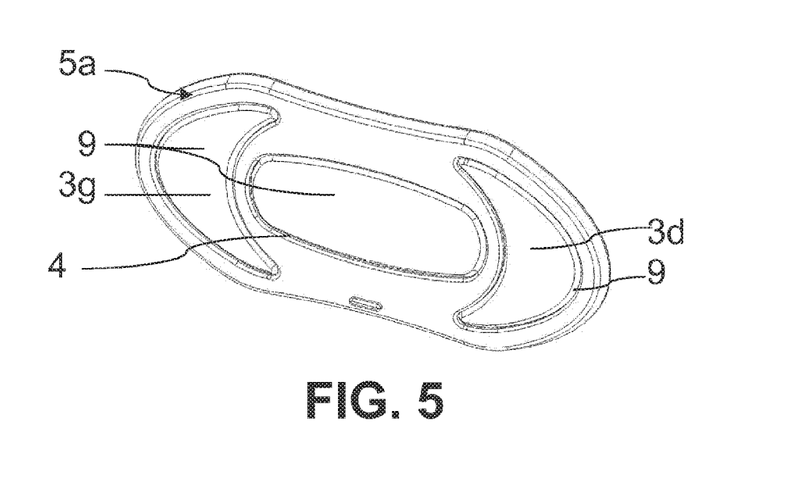
FIGS. 5 to 7 are respective schematic representations in perspective of a shell cover, of a shell receptacle and of the cover and receptacle fitted one in the other in order to form a closed shell forming part of the signaling device according to the present invention.
Figure 6:
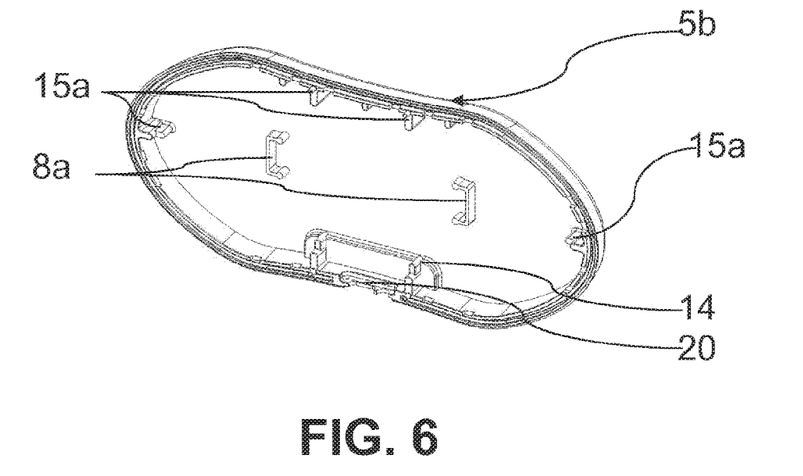
Figure 7:
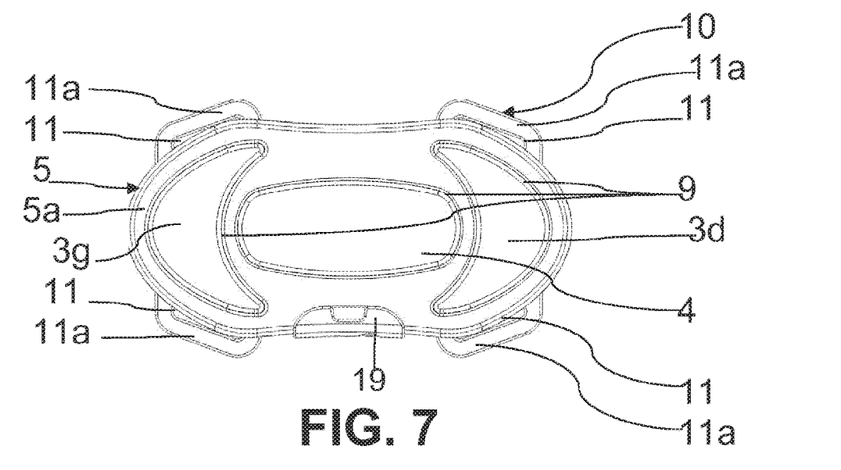
Figure 8:
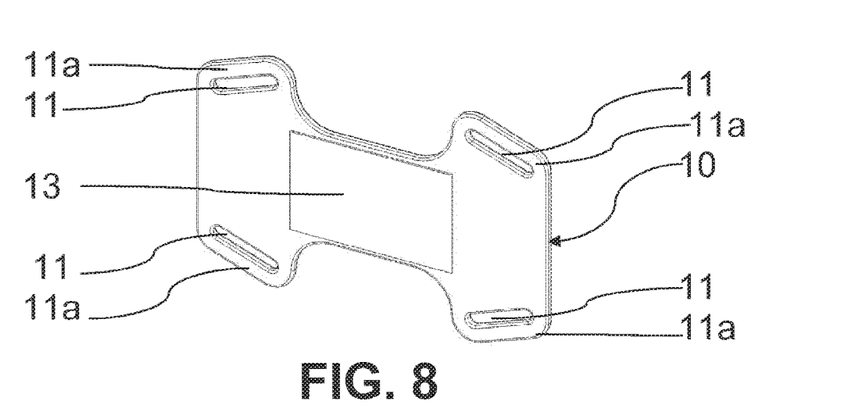
FIG. 8 is a schematic perspective representation of a shell support used in an embodiment of the signaling device according to the present invention.

In FIG. 4, a printed circuit card 15 is visible, intended to be housed in the shell 5. FIG. 5 shows a first shell portion 5a forming a cover. FIG. 6 shows a second shell portion 5b forming a receptacle. FIG. 7 shows a shell 5 assembled on a shell support 10 intended to be applied against the back of the user of the locomotive machine, and FIG. 8 shows the shell support 10 shown in isolation. For better visibility from outside, there may be reflective strips on the periphery of the shell 5.

As shown in FIG. 1, for fixing thereof against the back of a user, the signaling device 1 may comprise at least one adjustable strap 6 passing through the shell 5 and winding around the body of the user while having quick attachment means 7m, 7f by snapping in, advantageously two straps 6 winding around a respective shoulder of the user. The shell 5 may therefore be provided externally with at least two adjustable straps 6 intended to attach the shell 5 to the back of the user.

The straps 6 may be equipped with light emitting diodes colored yellow or orange, so as to make the user visible, especially if the latter is passing a line of automobiles. The light emitting diodes may be integrated in a housing, which is fixed to the strap, with a housing for the right-hand strap 6 and a housing for the left-hand strap 6. Activation of the light emitting diodes on the straps 6 may be done in two ways. According to a first way, the activation may be done in a wired form, by connecting them to the signaling device 1 according to the present invention. It is then necessary to provide electrical connections, which may reduce the impermeability of the shell 5.

According to a second way, the activation may be done wirelessly with a transmitter 2 in the signaling system and a receiver on one of the straps 6. The presence of small accumulators on the strap 6 is advantageous. Such luminous straps 6 make the locomotive machine visible in the external environment thereof, for example by making it visible for a travelling machine in a rearview mirror of the vehicle preceding the locomotive machine then travelling.

Referring in particular to FIGS. 5 and 6, the shell 5 may comprise a first shell portion 5a forming a cover and a second shell portion 5b forming a receptacle for the electronic means and said at least one electrical supply source 8. It is the second shell portion 5b that is intended to be facing the back of the user.

The first 5a and second 5b portions of the shell 5 can fit together one in the other with the first shell portion 5a having an opposite face furthest away from the second portion 5b in the fitted-together position of the first 5a and second 5b portions of the shell 5.

The signaling light or lights in the form of lamps or light emitting diodes are inside the shell 5. A single light emitting diode is referenced 18 in FIG. 4, but this reference is valid for all the light emitting diodes situated on the printed circuit card 15.

As shown in FIG. 4, the first shell portion 5a forming a cover may have transparent zones 9 facing the or each secondary signaling light housed inside the shell 5.

As shown in FIG. 5, the second shell portion 5b forming a receptacle can receive electronic means and the battery referenced 8 in FIG. 2. The second shell portion 5b may comprise stops 8a at least partially delimiting the surroundings of the battery as well as tabs 15a supporting the printed circuit card, the battery 8 and the printed circuit card 15 not being visible in FIG. 5 but being visible in FIG. 2.

In FIG. 5, an entry port 20 for an electrical socket is visible, for example for recharging the battery in the second shell portion 5b. A protective plug, visible in FIGS. 9 and 11 under the reference 19, surrounds this entry port 20 while joining the first and second shell portions. The second shell portion 5b comprises a half-compartment 14 intended to be supplemented by a half-compartment carried by the first shell portion in order to form a semi-closed assembly and to guarantee a seal at this entry port 20. By virtue of the form of the protective plug, it is possible to use a multifunction button.

The use of a flexible printed circuit card 15 as shown in FIG. 4 makes it possible to manufacture a flexible shell 5, which procures a better sensation for the user in carrying the shell 5 combined with ease of storage.

The first 5a and second 5b portions of the shell 5 can advantageously be 100% recyclable. The fact that the first 5a and second 5b portions of the shell 5 are fitted one in the other procures ease of charging and sealing of the 100% impervious shell 5. This is particularly relevant when the recharging of the battery or batteries inside the shell 5 is done by induction, given that, in this case, there is no need for a charging entry port on the periphery of the shell 5.

The shell 5 can be molded in a single block without any opening to the outside, the secondary signaling light or lights being placed inside the shell 5. The first shell portion 5a forming a cover is injected from transparent material, light orange in color, with the addition of a mask 5c on the zones that are to reveal the secondary signaling lights. The second shell portion 5b forming the receptacle can be injected from opaque material of various colors. There is therefore not any need to glue on windows in order to allow the light beams from the secondary signaling lights to emerge from the shell 5, giving a better guaranteed seal. The shell 5 is molded with a mold that is relatively simple in design.

The transparent zones 9 for passage of the light beams from the signaling light or lights are convex so that the light beams are always visible, whatever the angle of inclination of the driver, whether he be in a more or less straight position or lying on the locomotive machine. This makes the light signals visible even if the signaling device 1 according to the present invention is at 900.

In a first embodiment of the fixing of the shell 5 on the back of the user, the second shell portion 5b is intended to rest against a portion of the back of the user. In this case, the second shell portion 5b or even the entire shell 5 with the first 5a and second 5b shell portions thereof may have four passage recesses 11 matched in pairs for a passage of a strap portion 6 of one of said at least two adjustable straps 6. This is shown partly in FIG. 10.

In a second embodiment shown in particular in FIGS. 7 and 8, a shell support 10 is interposed between the second portion and the back of the user. The shell support 10 may have a bearing face intended to rest against a portion of the back of the user. In this second embodiment, on a shell support face 10 opposite to the face matching a portion of the back, quick attachment means 13 of the self-adhesive strip type are provided on facing portions of the shell support 10 and of the second shell portion 5b.

As can be seen in FIG. 7, the shell support 10 can project beyond the shell 5 when the shell 5 is placed on top of the shell support 10 by at least four branches 11a, each branch having a passage recess 11 for a strap portion 6 of one of said at least two adjustable straps 6, the branches 11a and the passage recess 11 thereof being laterally matched in pairs.

Figure 9:
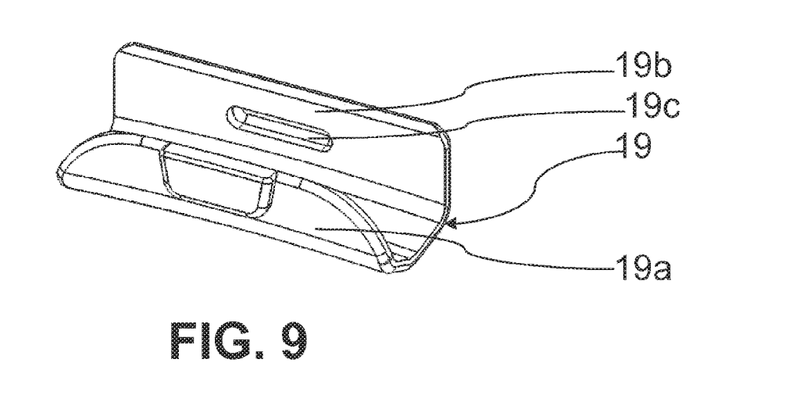
FIGS. 9 and 11 are schematic representations in perspective from two different viewing angles of a part joining the two shell portions, producing an inlet and outlet port communicating with the interior of the shell in one embodiment of the signaling device according to the present invention.
Figure 11:
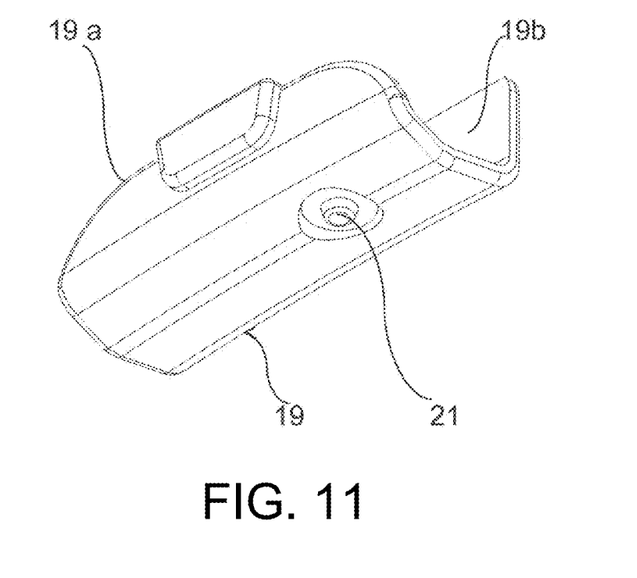
Figure 12:
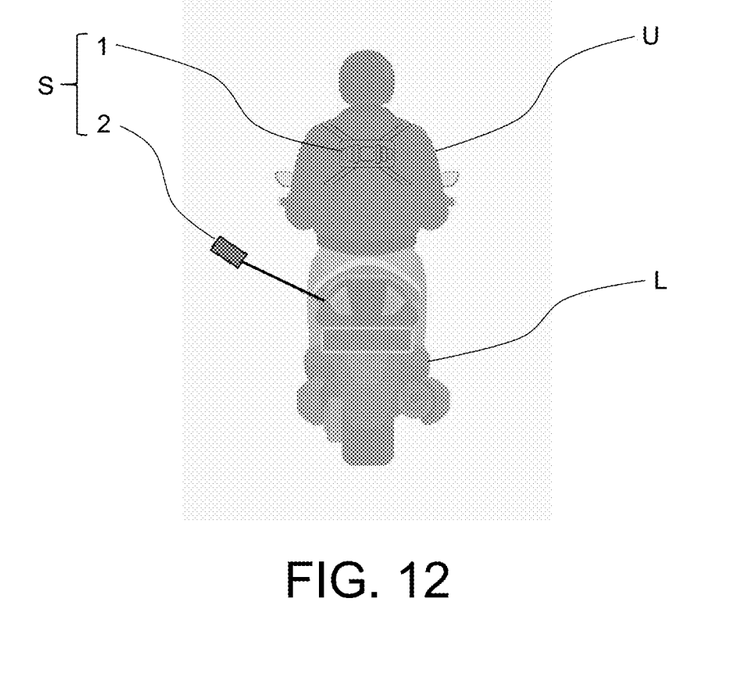
FIG. 12 is a schematic representation of a locomotive machine on which is placed a transmitter, the signaling device being placed on the back of a user.

FIGS. 9 and 11 show a piece 19 receiving inside it a part of the first and second shell portions. This piece 19 can serve to reinforce the holding of the first and second shell portions with respect to one another but also to form a sealed entry for a communication port.

The protective plug 19 has a U-shaped cross section with a first branch 19a of the U applied against a part of the first shell portion and a second branch 19b of the U applied against a part of the second shell portion, the bottom of the U being applied against the edge of the shell. The protective plug 19 also comprises a passage able to allow a connection with the electronic means integrated in the second shell portion forming a receptacle. The protective plug 19 also makes it possible to use the multifunction pushbutton. FIG. 11 shows an entry 21 in the shell for this protective plug 19, an entry 21 that can be closed.

Referring in particular to FIG. 1, although the user is not shown in this figure, each strap 6 can be adjusted in order to be attended to pass round a respective shoulder of the user while passing under an arm of the user.

Figure 10:
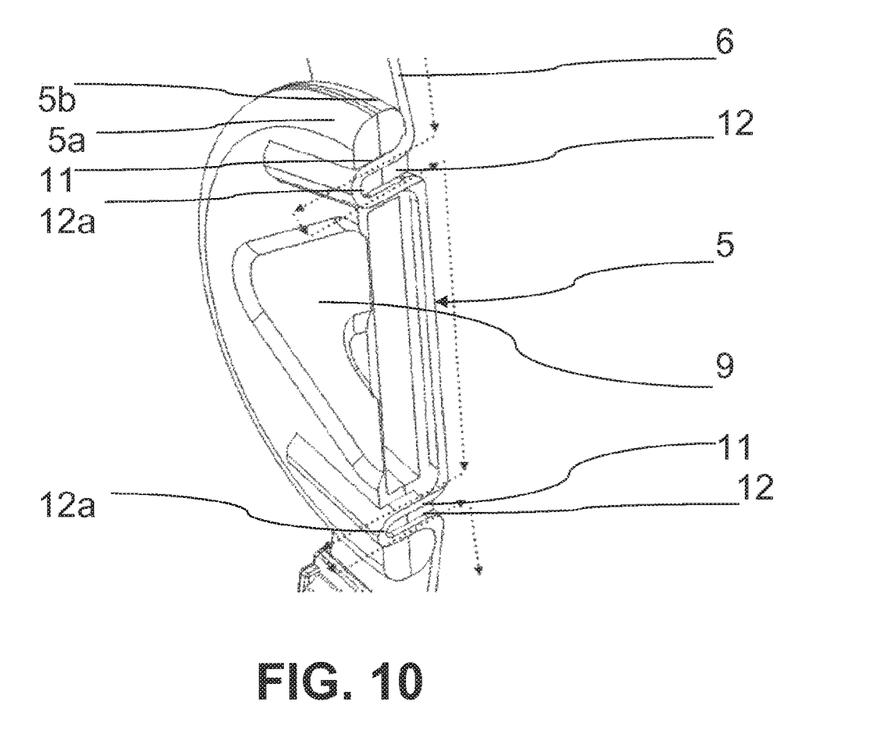
FIG. 10 is a schematic representation of a perspective cross section of a shell according to one embodiment of the present invention, the shell having passage recesses for a respective strap used to attach the signaling device to the back of the user of the locomotive machine.

FIG. 10 shows a second shell portion 5b carrying the recesses, and therefore no shell support interposed between the second shell portion and the back of the user. What will be stated is however valid for the embodiment showing a shell support.

For the two embodiments with or without shell support 10, each passage recess 11, either on the second shell 5 or on the shell support 10, can have a median stud 12. The median stud 12 can extend at the middle and in the length of the recess 11 while being in the form of a right-angled parallelepiped having a narrower longitudinal rounded face 12a.

A portion of each strap 6 can pass around the median stud 12 around the rounded face 12a while leaving free the opposite narrower longitudinal face for each of the two recesses 11 that are associated therewith, each strap 6 having two free ends carrying respectively a male or female snapping-in means.

Referring more particularly to FIG. 1, each strap 6 can have an intermediate strap portion 6 oriented towards the other strap 6 at the snapping-in means intended to be situated on the chest of the user. The two intermediate strap portions 6 can have a free end with male and respectively female complementary snapping-in means for connection thereof.

It should be noted that the signaling device 1 can also be integrated in a jacket on the back of the user, for example in a closed transparent pocket, by means of a self-adhesive strip or fixed by two adjustable straps 6 on the airbag jacket. The jacket may be a jacket that is inflatable in the event of accident, also referred to as an airbag-triggerer protective jacket, also known by the English term air-bag vest.

The signaling device 1 according to the invention, in particular in the electronic means thereof in the form of a printed circuit card 15, may incorporate one or more systems fulfilling one or more of the following functions: a local navigation and geopositioning function, a function of connection with a cellphone that has downloaded a suitable application, or an electronic-key function locking starting of the locomotive machine when the signaling device 1 is distant by a predetermined distance from the locomotive machine or unlocking it when closer to the locomotive machine than the predetermined distance.

A pairing of the Bluetooth® type or by cable can connect the signaling device 1 according to the invention to a cellphone, to a tablet or to a computer, portable or not. This makes it possible for the transmitter 2 of the system to record information such as for example the surname and first name of the user, his date of birth, his blood group, his photograph, the date his driving license was obtained, and where applicable the registration of the locomotive machine, the serial number thereof, photographs of the machine and the maintenance record thereof.

The application makes it possible to pair firstly the transmitter 2, connected to the locomotive machine, and the signaling device 1 according to the present invention, carried by the user with, secondly, a cellphone. For example, the user can create his profile on this application. Before travelling, he can define his route. Once the route has been validated, the persons who are connected and who have access to his profile can follow his route directly. Once he has arrived at his destination, the user indicates this on the application. In the event of falling or disappearance, the user can be contacted and, if he does not reply, he can be geolocated because of his navigation system so that rescue occurs as quickly as possible. Even if the cellphone no longer has any battery, the user is still followed in real time.

By virtue of this function, the user carrying the signaling device 1 can view data and the activated signals of the signaling device 1 on the screen of the cellphone. The application in the cellphone harvests and supplies statistical data. This allows better management of energy and better visibility of the data stored.

In addition, the transmitter 2 can be connected to the starting system of the locomotive machine. The signaling device 1 according to the present invention must be at a maximum distance of 2 meters from the transmitter 2 in order to start the engine. If the signaling device 1 according to the present invention is at more than two meters from the transmitter 2, the engine can stop instantaneously and an alarm can be triggered. This function is assimilated to the electronic key or hands-free kit function for opening and starting an automobile. This provides protection against theft.

In the event of a fall or accident, the signaling device 1 according to the present invention can trigger a specific audible signal in order to alert persons situated at a good distance from the accident. If the fall or accident occurs in a deserted place, this will enable the participants to find the user carrying the device 1 more quickly. This applies for example in an avalanche for a snowmobile. The driver has the possibility of stopping the sound manually. If he is unconscious, the signaling device 1 according to the present invention sends an emergency signal to the assistance. The emergency signal to the assistance can also be sent manually by the driver.

It is possible to dedicate a second battery solely to this function, or to use a magnetic connection cable for connecting to the battery of the locomotive machine. A saving in time for locating the driver is thus obtained.

By virtue of the chip of the navigation and local geopositioning system advantageously integrated in the transmitter 2, in the event of theft the vehicle can be found wherever it is situated.

Finally, the invention relates to an assembly consisting of a locomotive machine and a signaling system comprising a signaling device 1 carried on the back of a user of the locomotive machine, characterized in that the signaling device 1 is as previously described, and a transmitter 2 housed in the locomotive machine or being situated in the vicinity of the locomotive machine.

The invention claimed is:

1. A signaling system comprising:
  a signaling device adapted to be placed removably on a back of a user of a locomotive machine, the back remaining visible in an environment of the machine in motion, and
  a transmitter adapted to be connected to at least one primary signaling device of the locomotive machine indicating a right-hand or left-hand lateral direction that the locomotive machine is taking in motion so as to detect signals of the primary signaling device of the locomotive machine,
  wherein the signaling device comprises:
  a receiver connected to at least one secondary signaling light integrated in the signaling device, the receiver being able to receive a signal transmitted by the transmitter, and
  electronic means for processing the signal and controlling switching on and/or off of the at least one secondary signaling light synchronously with switching on and/or off of the at least one primary signaling light, wherein the electronic means include an accelerometer, wherein measurements of the accelerometer are interpreted to make it possible to detect a right or left lateral variation in direction of movement, and to check that the at least one secondary signaling light is indeed indicating the right or left lateral direction followed by the user and the locomotive machine.

2. The signaling system according to claim 1, wherein the electronic means causes automatic reversal of the at least one secondary signaling light when the at least one secondary signaling light is interpreted as not indicating the right or left lateral direction followed by the locomotive machine, so that the at least one secondary signaling light correctly indicates the right or left lateral direction followed by the user and the locomotive machine, otherwise the electronic means causes generating information intended for the user that the right or left lateral direction indicated by the at least one secondary signaling light is incorrect.

3. The signaling system according to claim 2, wherein the transmitter is connected to a circuit controlling a right primary direction indicator light and a left primary direction indicator light of the locomotive machine, and the at least one secondary signaling light comprises a right secondary direction indicator light and a left secondary direction indicator light, wherein at least one of secondary direction indicator lights is interpreted to be in operation or not according to the electrical supply thereof.

4. The signaling system according to claim 3, wherein the transmitter is also connected to a circuit controlling at least one auxiliary primary signaling light of the locomotive machine, and the signaling device also comprises at least one auxiliary secondary signaling light, each of the at least one auxiliary primary and secondary signaling light being selected from the group consisting of a stop light indicating braking, a tail light, a fog light or a hazard warning light.

5. The signaling system according to claim 4, wherein the transmitter has a current detector in the or each control circuit associated with the or a primary signaling light or the information on switching on of a primary signaling light is transmitted by wire connection to the transmitter.

6. The signaling system according to claim 3, wherein the transmitter has a current detector in the or each control circuit associated with the or a primary signaling light or the information on switching on of a primary signaling light is transmitted by wire connection to the transmitter.

7. The signaling system according to claim 1, wherein the transmitter is connected to a circuit controlling a right primary direction indicator light and a left primary direction indicator light of the locomotive machine, and the at least one secondary signaling light comprises a right secondary direction indicator light and a left secondary direction indicator light, wherein at least one of secondary direction indicator lights is interpreted to be in operation or not according to the electrical supply thereof.

8. The signaling system according to claim 7, wherein the transmitter is also connected to a circuit controlling at least one auxiliary primary signaling light of the locomotive machine, and the signaling device also comprises at least one auxiliary secondary signaling light, each of the at least one auxiliary primary and secondary signaling light being selected from the group consisting of a stop light indicating braking, a tail light, a fog light or a hazard warning light.

9. The signaling system according to claim 8, wherein the transmitter has a current detector in the or each control circuit associated with the or a primary signaling light or the information on switching on of a primary signaling light is transmitted by wire connection to the transmitter.

10. The signaling system according to claim 7, wherein the transmitter has a current detector in the or each control circuit associated with the or a primary signaling light or the information on switching on of a primary signaling light is transmitted by wire connection to the transmitter.

11. The signaling system according to claim 10, wherein the transmitter comprises a dedicated battery, rechargeable by induction, by microcable via a USB socket, or by cable connected to a battery of the locomotive machine, a visual and/or audible indicator present on the signaling device informing of a low dedicated-battery charge for the transmitter.

12. The signaling system according to claim 1, wherein the at least one secondary signaling light is in the form of a lamp or light emitting diodes, a light intensity of which is variable according to external brightness.

13. The signaling system according to claim 12, which comprises a radar detector intended to detect a radar of another locomotive machine in a vicinity of the locomotive machine for which the signaling system is intended, wherein the detector estimates a distance separating the other locomotive machine from the signaling device and, when the distance is less than a predetermined minimum safety distance between the two locomotive machines stored in a memory of the electronic means, the at least one secondary signaling light is switched on the at least one signaling device with a recognizable specific intensity and/or periodicity in order to indicate that the predetermined minimum safety distance between the two locomotive machines is not complied with.

14. The signaling system according to claim 1, wherein the signaling device comprises:
  a hollow shell in first and second portions secured together removably, wherein the hollow shell delimits a closed internal space sealingly housing the at least one secondary signaling light, the electronic means and at least one electrical supply source for the electronic means and for the receiver, and at least one adjustable strap passing through the shell and winding around a body of the user, the strap having quick-attachment snap-in connectors.

15. The signaling system according to claim 14, wherein the first shell portion forms a cover and the second shell portion forms a receptacle for the electronic means and for the at least one electrical supply source, the second shell portion being adapted to be facing the back of the user, the first and second shell portions fitting together, the first shell portion having an opposite face furthest away from the second shell portion in the fitted-together position of the first and second shell portions and transparent zones facing the at least one secondary signaling device housed inside the shell, the shell being provided externally with at least two adjustable straps intended to attach the shell to the back of the user.

16. The signaling system according to claim 15, wherein:
the second shell portion is intended to rest against a portion of the back of the user, the second shell portion or the entire shell with the first and second shell portions having four passage recesses matched in pairs for passage of a strap portion of one of the at least two adjustable straps, or
the signaling device comprises a shell support configured to be interposed between the second shell portion and the back of the user, the shell support having a bearing face intended to rest against a portion of the back of the user and, on a face of the shell support opposite to the bearing face, quick-attachment self-adhesive strip connectors with the second shell portion, the shell support projecting beyond the shell when the shell is superimposed on the shell support by at least four branches, each of the branches having a passage recess for a strap portion of one of the at least two adjustable straps, the branches and the passage recess thereof being laterally matched in pairs.

17. The signaling system according to claim 16, wherein each strap is adjusted so as to be intended to pass around a respective shoulder of the user while passing under the arm of the user, each passage recess having a median stud lying at a middle and in a length of the recess and having a shape of a right-angled parallelepiped having a narrower longitudinal rounded face, a portion of each strap passing around the median stud around a rounded face while leaving free an opposite narrower longitudinal face for each of the two recesses that are associated therewith, each strap having two free ends respectively carrying a male or female snap-in connector.

18. The signaling system according to claim 17, wherein each strap has an intermediate strap portion oriented towards the other strap at the snap-in connector intended to be situated on the chest of the user, the two intermediate strap portions having a free end with complementary snap-in connectors for securing thereof.

19. The signaling system according to claim 18, wherein the electronic means are in the form of a printed circuit card, the signaling device having one or more systems fulfilling one or more of the following functions: a navigation and local geopositioning function, a function of connection with a cellphone that has downloaded a suitable application, an electronic key function locking starting of the locomotive machine when the signaling device is distant by a predetermined distance from the locomotive machine and unlocking it when the signaling device is closer to the locomotive machine than the predetermined distance.

20. An assembly consisting of a locomotive machine and a signaling system according to claim 1, wherein the signaling device is carried on the back of a user of the locomotive machine, and wherein the transmitter is housed in the locomotive machine or situated in a vicinity of the locomotive machine.

* * * * *